(12) United States Patent
Thiel et al.

(10) Patent No.: US 9,146,705 B2
(45) Date of Patent: Sep. 29, 2015

(54) SPLIT BRAIN PROTECTION IN COMPUTER CLUSTERS

(75) Inventors: Gregory Thiel, Black Diamond, WA (US); Manoharan Kuppusamy, Redmond, WA (US); Yogesh Bansal, Sammamish, WA (US)

(73) Assignee: Microsoft Technology, LLC, Redmond, WA (US)

( * ) Notice: Subject to any disclaimer, the term of this patent is extended or adjusted under 35 U.S.C. 154(b) by 460 days.

(21) Appl. No.: 13/441,922

(22) Filed: Apr. 9, 2012

(65) Prior Publication Data

US 2013/0268495 A1 Oct. 10, 2013

(51) Int. Cl.
| G06F 11/00 | (2006.01) |
| G06F 7/00 | (2006.01) |
| G06F 11/20 | (2006.01) |
| G06F 11/14 | (2006.01) |

(52) U.S. Cl.
CPC .............. *G06F 7/00* (2013.01); *G06F 11/1425* (2013.01); *G06F 11/20* (2013.01); *G06F 11/004* (2013.01); *G06F 11/1482* (2013.01)

(58) Field of Classification Search
CPC . G06F 11/10; G06F 11/2007; G06F 11/2028; H04L 41/0663
USPC .............. 709/226; 714/3, 16, 43, 48; 710/307
See application file for complete search history.

(56) References Cited

U.S. PATENT DOCUMENTS

| 5,539,883 | A | * | 7/1996 | Allon et al. ................... 718/105 |
| 6,018,810 | A | * | 1/2000 | Olarig .............................. 714/43 |
| 6,449,700 | B2 | * | 9/2002 | Hagersten et al. ............. 711/152 |
| 6,931,568 | B2 | * | 8/2005 | Abbondanzio et al. .......... 714/11 |
| 6,965,936 | B1 | | 11/2005 | Wipfel et al. |
| 7,464,378 | B1 | * | 12/2008 | Limaye et al. ................ 718/100 |
| 7,478,263 | B1 | * | 1/2009 | Kownacki et al. ........... 714/4.11 |
| 7,496,782 | B1 | | 2/2009 | Kownacki |
| 7,725,579 | B2 | | 5/2010 | Cook et al. |
| 7,730,489 | B1 | * | 6/2010 | Duvur et al. ................... 718/104 |
| 7,774,469 | B2 | | 8/2010 | Massa et al. |
| 8,001,413 | B2 | | 8/2011 | Wetmore et al. |
| 2001/0008019 | A1 | * | 7/2001 | Vert et al. ........................... 714/1 |
| 2002/0103663 | A1 | * | 8/2002 | Bankier et al. ..................... 705/1 |

(Continued)

OTHER PUBLICATIONS

"Sun Storage Unified Storage System Administration Guide", Retrieved at <<http://wikis.sun.com/download/attachments/57513819/820-4167-10.pdf>>, Sep. 2009, pp. 302.

(Continued)

*Primary Examiner* — Bryce Bonzo
*Assistant Examiner* — Jeison C Arcos
(74) *Attorney, Agent, or Firm* — Louise Bowman; Danielle Johnston-Holmes; Micky Minhas (57) ABSTRACT

A computer cluster can be divided into a plurality of failure scopes and a voting constraint can be enforced. The voting constraint can allow a portion of the cluster to provide the service if a majority of health votes from cluster members is obtained by that portion. A loss of connectivity between a first failure scope, which has a majority of cluster members in the cluster, and one or more other failure scopes in the cluster can be detected. The loss of connectivity can be such that the first failure scope does not have connectivity to a member in any other failure scope in the cluster. In response to detecting the loss of connectivity, a split brain situation in the cluster can be automatically protected against by preventing the first failure scope from providing the service.

20 Claims, 4 Drawing Sheets

(56) References Cited

U.S. PATENT DOCUMENTS

| | | | |
|---|---|---|---|
| 2003/0159084 A1* | 8/2003 | Murphy et al. | 714/13 |
| 2004/0205148 A1 | 10/2004 | Bae et al. | |
| 2005/0125557 A1* | 6/2005 | Vasudevan et al. | 709/239 |
| 2009/0276657 A1* | 11/2009 | Wetmore et al. | 714/4 |

OTHER PUBLICATIONS

"Windows Server Multi-site Clustering", Retrieved at <<http://www.acnc.com/media/pdf/36_f_WPD-Win_Server_Multi.pdf>>, Retrieved Date: Dec. 14, 2011, pp. 14.

\* cited by examiner

SPLIT BRAIN PROTECTION IN COMPUTER CLUSTERS

BACKGROUND

In computer system clusters, multiple computing system members work together in a cluster to provide a service. Each member may be a computing machine or some other computing unit, such as a group of computing machines. Clustered environments often use a voting scheme to determine when a portion of the cluster can bring online managed services (database services, etc.). The voting scheme can use a numerical majority of cluster member health votes to determine the portions of the cluster that can form a quorum and provide services. A health vote can indicate that the corresponding member is healthy and able to participate in the quorum to provide services. For example, such health votes may be provided using heartbeat messages. In a disaster scenario, an administrator may override the regular split brain protection provided by the voting scheme and force a minority subset of the machines to take control of the quorum (with a minority quorum) and bring services and resources online

SUMMARY

In the disaster scenario described above, the other members of the cluster may eventually become sufficiently healthy to form a majority quorum with a majority of the cluster members. If so, then the majority quorum could bring services and resources online without communicating with the active minority quorum, thus creating a split brain scenario with the majority quorum and the minority quorum both providing services in a non-coordinated manner. This could result in one or more issues, such as having multiple inconsistent versions of a database being managed by the cluster.

The description herein is directed to providing automatic split brain protection in computer clusters. Such automatic protection may not be full-proof. For example, to actually assure that a split brain scenario does not occur, administrators may also need to follow one or more techniques to compliment the automatic split brain protection (e.g., waiting a certain period of time before overriding a voting scheme, etc.).

In one embodiment, the tools and techniques can include managing a computer system cluster that provides a service. The cluster can be divided into a plurality of failure scopes. As used herein, a failure scope is a group of one or more cluster members. The members in a failure scope may all be in the same physical location (e.g., the same data center), or they may be in different locations. The management can include enforcing a voting constraint that allows a portion of the cluster to provide the service if a majority of health votes from cluster members is obtained by that portion. A loss of connectivity between a first failure scope, which has a majority of cluster members in the cluster, and one or more other failure scopes in the cluster can be detected. The loss of connectivity can be such that the first failure scope does not have connectivity to a member in any other failure scope in the cluster. In response to detecting the loss of connectivity, the technique can include automatically protecting against a split brain situation in the cluster by preventing the first failure scope from providing the service.

In another embodiment of the tools and techniques, it can be determined whether a disjoint communication situation has occurred. The disjoint communication situation can include a majority quorum, including a majority of the cluster members, not having connectivity with at least one member in at least a predetermined number of failure scopes in the cluster such as at least two of the failure scopes (for example, the predetermined number may be two failure scopes in one embodiment, three failure scopes in another embodiment, four failure scopes in another embodiment, etc.). If it is determined that the disjoint communication situation has occurred, then the technique can include automatically responding to the disjoint communication situation by preventing the majority quorum from providing the service even if the majority quorum obtains a majority of health votes from the cluster members. If it is determined that the disjoint communication situation has not occurred, then the majority quorum can provide the service if the majority quorum obtains a majority of health votes from the cluster members.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved management of computer clusters to automatically reduce the possibility of a split brain situation on some scenarios, such as in disaster scenarios. Such improvements may result from the use of various techniques and tools separately or in combination.

Such techniques and tools may include dividing the cluster into multiple failure scopes. For example, each failure scope may be located in a different physical location, such as in a different data center. To begin or continue providing services (e.g., to provide access to a managed database), a quorum may need at least one health vote from at least a predetermined number of the failure scopes. This can be in addition to a requirement for healthy votes from a majority of the cluster members. For example, the predetermined number of failure scopes may be two, so that a quorum needs at least one health vote from one or more members in each of at least two of the failure scopes in the cluster (which is all the failure scopes in this example with two failure scopes in the cluster). This multiple-scope requirement may be coupled with a predetermined time period. For example, a majority quorum may cease providing the service if it has been unable to obtain health votes from members in the specified number of failure scopes for a predetermined period of time (e.g., for thirty minutes). Additionally, a majority quorum may be inhibited from bringing services back online until health votes can be obtained from members in the specified number of failure scopes. In this scenario, an administrator may have a policy of waiting at least thirty minutes from a loss of connectivity until the administrator provides user input to override the regular quorum voting requirements and force a minority quorum to provide the services. Thus, by the time the administrator provides the overriding user input, the majority cluster would have ceased providing the service and it would be prevented from coming back online to provide the service. The administrator may also take other measures to assure that a majority of the clusters outside of this minority quorum cannot obtain health votes from the specified number of failure scopes, depending on the configuration of the cluster. In this way, the automated actions of the cluster in obtaining votes from the requisite number of failure scopes can protect against a split brain scenario.

These automated actions to prevent the majority from forming a quorum and providing services can be done without the need to manually shut down the machines in the majority to prevent those machines from coming online and providing the services in a split brain scenario. Accordingly, this and/or one or more other benefits may be realized from the tools and techniques described herein. The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

Figure 1:
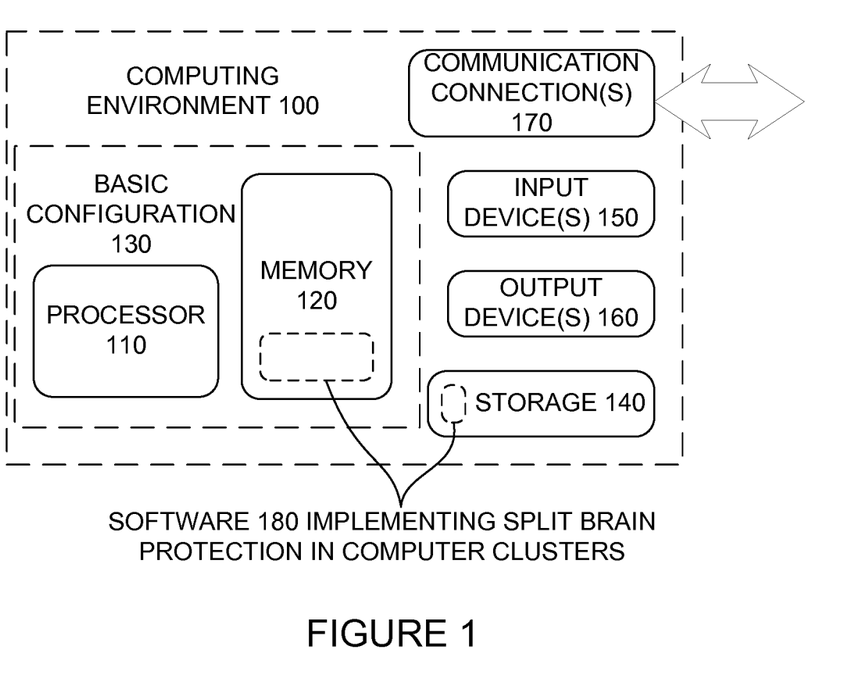
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a computing machine in a computer system cluster. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, slate devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing split brain protection in computer clusters.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be an input device for sensing a gesture such as touch (e.g., a keyboard, mouse, pen, touch screen, or trackball); a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "detect," "protect," "receive," and "operate" to describe computer operations in a computing environment. These and other similar terms are high-level abstractions for operations performed by a computer, and should not be confused with acts performed by a human being, unless performance of an act by a human being (such as a "user" or "administrator") is explicitly noted. The actual computer operations corresponding to these terms vary depending on the implementation.

II. Computer Cluster System and Environment with Split Brain Protection

Figure 2:
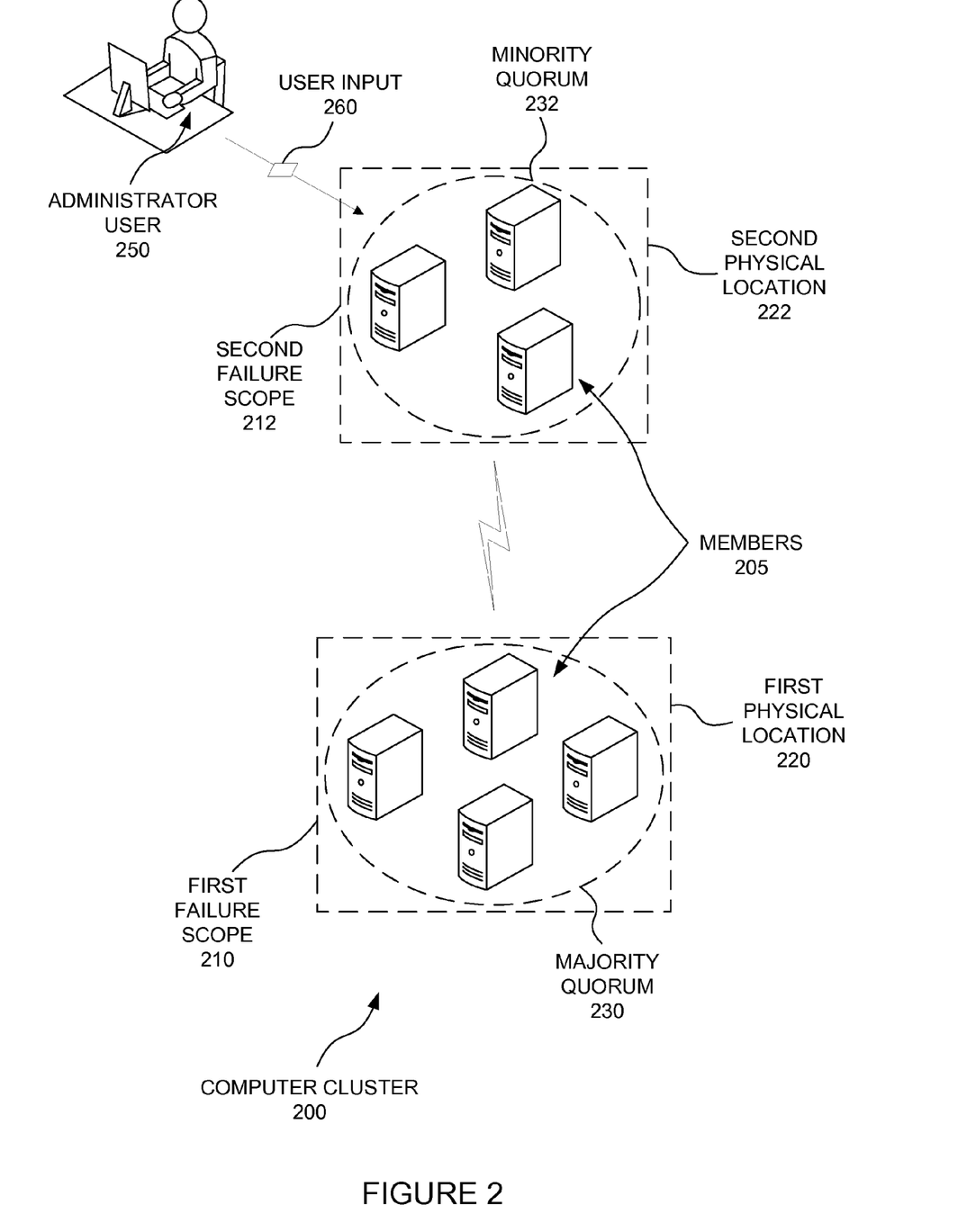
FIG. 2 is a schematic diagram of a computer system cluster.

FIG. 2 is a schematic diagram of a computer system cluster (200) in conjunction with which one or more of the described embodiments may be implemented. The cluster (200) can include a plurality of cluster members (205). For example, each cluster member (205) may be a real or virtual machine, such as a server machine. The cluster (200) can be divided into a first failure scope (210) and a second failure scope (212). The first failure scope (210) may be in a first physical location (220) and the second failure scope (212) may be in a second physical location (222), which can be remote from the first physical location (220) (e.g., in different cities, different states or provinces, different countries, etc.). For example, the first failure scope (210) may include members (205) in a first data center and the second failure scope (212) may include members (205) in a second data center. The failure scopes (210 and 212) may communicate with each other by one or more communication connections, such as using a dedicated communication channel and/or a computer network such as a wide area network or a global computer network.

In regular operation, the members (205) in the first failure scope (210) and the members (205) in the second failure scope (212) can communicate so that they can both be part of a quorum. The computer cluster (200) may operate on a voting scheme. For example, a portion of the members (205) may be able to form a quorum to provide a service (e.g., a service to remote clients) if that portion can obtain a health votes from a majority of the members (205). This voting technique can prevent a split brain scenario in the computer cluster (200) during regular operation because there could not be a second majority quorum that was disconnected from the majority quorum.

However, in a disaster scenario, connection between the first failure scope (210) and the second failure scope (210) may be lost. For example, power may be lost at the first physical location (220), or a computer network connection between the first physical location (220) and the second physical location (222) may cease functioning properly. In such a disaster scenario, an administrator (250) may provide user input (260) to the members (205) of the second failure scope (212) to override these regular split brain protections and force members (205) of the second failure scope (212) to form a minority quorum (232) and come online to provide the service, even without having a majority of health votes from the members (205). With just the regular majority-controlled split brain protection discussed above, the members (205) in the first failure scope (210) could form a majority quorum (230) to come online and provide the service at the same time as the minority quorum (232), without communication between the two quorums (230 and 232). As an example of this split brain scenario, the two quorums (232 and 232) may each be making changes to a database, resulting in multiple conflicting versions of the database. However, the techniques discussed below can provide automatic protection against such a split brain scenario by preventing the majority quorum (230) from coming online or staying online and providing the service when the connection between the failure scopes (210 and 212) is lost. These techniques may also apply in other situations, such as where a cluster has more than two failure scopes, which may be in different physical locations.

III. Split Brain Protection Techniques

Several computer cluster split brain protection techniques will now be discussed. Each of these techniques can be performed in a computing environment. For example, the techniques may be performed by a computer cluster such as the computer cluster (200) discussed above. For example, each technique may be performed in a computer system (e.g., a computer system cluster) that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique.

Figure 3:
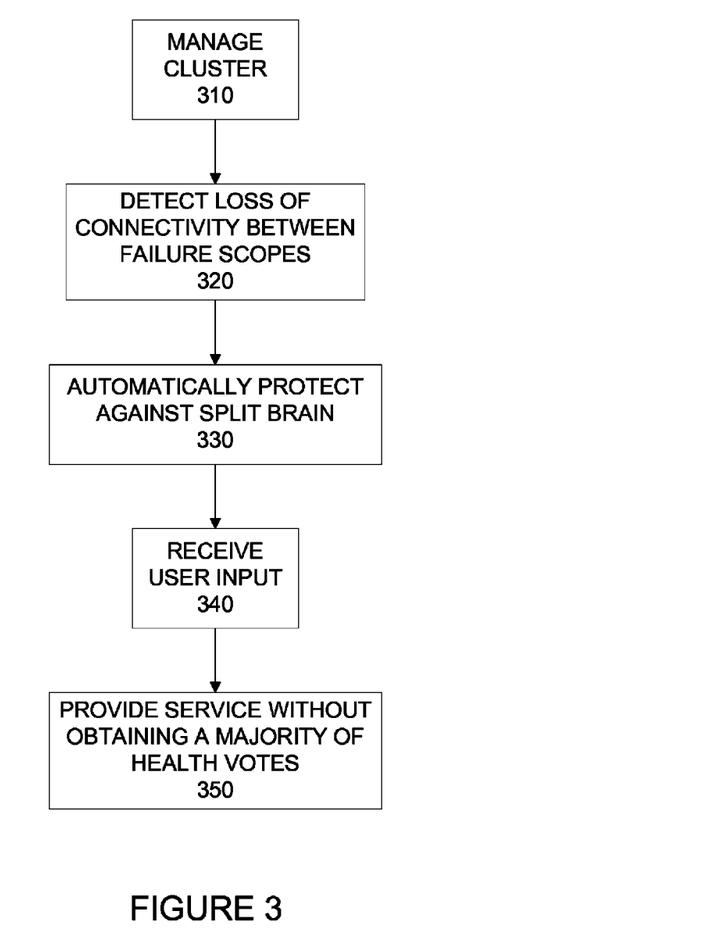
FIG. 3 is a flowchart of a computer cluster split brain protection technique.

Referring to FIG. 3, a computer cluster split brain protection technique will be described. The technique can include managing (310) a computer system cluster that provides a service. The cluster can be divided into a plurality of failure scopes. The management (310) can include enforcing a voting constraint that allows a portion of the cluster to provide the service if a majority of health votes from cluster members is obtained by that portion. A loss of connectivity between a first failure scope having a majority of cluster members in the cluster and one or more other failure scopes in the cluster can be detected (320). The loss of connectivity can be such that the first failure scope does not have connectivity to a member in any other failure scope in the cluster. In response to detecting (320) the loss of connectivity, a split brain situation in the cluster can be protected (330) against by preventing the first failure scope from providing the service.

Automatically protecting (330) against a split brain situation can include starting a timer in response to detecting the loss of connectivity. Preventing the first failure scope from providing the service can be done upon expiration of the timer. The service can provide access to a database and preventing the first failure scope from the providing the service can include dismounting the database from each of the members in the first failure scope.

Each failure scope can be in a different physical location, such as in a different data center. Also, each cluster member can be a real or virtual computing machine. Alternatively, each cluster member may be some other computing unit, such as a group of computing machines, etc.

The technique of FIG. 3 can also include receiving (340) user input at a second failure scope in the cluster. The user input can instruct the second failure scope to provide the service without obtaining a majority of health votes from cluster members. Additionally, the technique can include, in response to the user input, the second failure scope providing (350) the service without obtaining a majority of health votes from cluster members.

The loss of connectivity may result from any of various different causes (or combinations thereof), such as a faulty connection between the first failure scope and the one or more other failure scopes in the cluster, or poor health of the one or more other failure scopes in the cluster (e.g., from a power loss).

Figure 4:
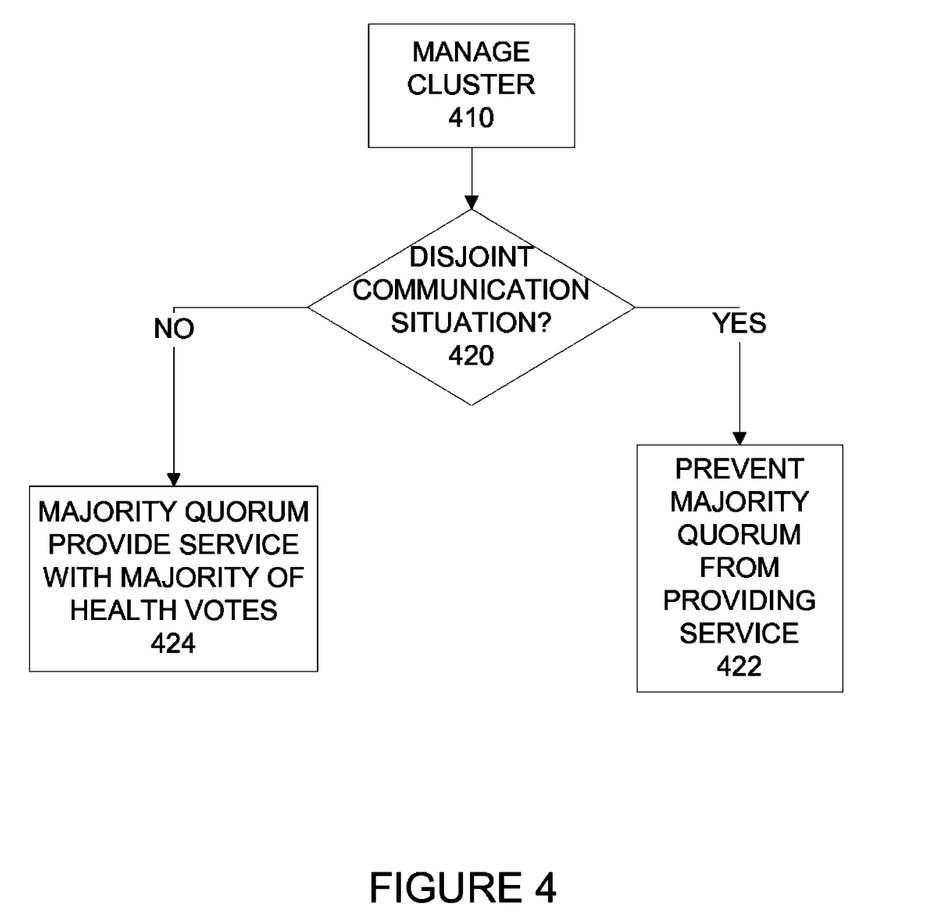
FIG. 4 is a flowchart of another computer cluster split brain protection technique.

Referring to FIG. 4, another computer cluster split brain protection technique will be discussed. For example, a computer system cluster can be managed (410). The cluster can be divided into a plurality of failure scopes, and the management (410) can include enforcing a voting constraint that allows a portion of the cluster to provide the service if a majority of health votes from cluster members is obtained by that portion. The technique can also include determining (420) whether a disjoint communication situation has occurred. The disjoint communication situation can include a majority quorum, which includes a majority of the cluster members, not having connectivity with at least one member in at least a predetermined number of failure scopes in the cluster. The predetermined number can be at least two. If it is determined (420) that the disjoint communication situation has occurred, then the technique can include automatically responding to the disjoint communication situation by preventing (422) the majority quorum from providing the service even if the majority quorum obtains a majority of health votes from the cluster members. If it is determined (420) that the disjoint communication situation has not occurred, then the majority quorum can provide (424) the service if the majority quorum obtains a majority of health votes from the cluster members.

In one embodiment the predetermined number can be two. In this embodiment, the disjoint communication situation can include a first failure scope, which has a majority of cluster members in the cluster, not having connectivity with one or more other failure scopes, such that the first failure scope does not have connectivity to a member in any other failure scope in the cluster. The disjoint communication situation may have a time component so that the connectivity situation includes a majority quorum, which has a majority of the cluster members, not having connectivity with at least one member in at least the predetermined number of failure scopes in the cluster for a predetermined period of time.

The service can provide access to a database, and preventing (422) the majority quorum from providing the service can include dismounting the database from each of the members in the majority quorum. As discussed above, each failure scope can be in a different physical location, and each cluster member may be a computing machine. The acts may further include receiving user input at a minority quorum having a minority of the cluster members (receipt of the user input may occur after some processing of the user input). The user input can instruct the minority quorum to provide the service without obtaining a majority of health votes from cluster members. Additionally, in response to the user input, the minority quorum can provide the service without obtaining a majority of health votes from cluster members.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
managing a computer system cluster that provides a service, the cluster having a plurality of cluster members and the cluster being divided into a plurality of failure scopes, with each of the failure scopes comprising a group of one or more cluster members and at least one of the failure scopes comprising a plurality of the cluster members, and the management including protecting against a split brain situation by enforcing a voting constraint, the voting constraint dictating that a portion of the cluster is allowed to provide the service while that portion has health votes from a majority of the cluster members and has health votes from cluster members in a predetermined number of failure scopes, the predetermined number being at least two, and the enforcement of the voting constraint including the following:
   determining that a particular portion of the cluster has health votes from a majority of the cluster members, the health votes that the particular portion has received from the majority of the cluster members indicating that the majority of the cluster members is healthy and able to participate in providing the service with the particular portion of the cluster;
   determining that the particular portion of the cluster has not obtained health votes from cluster members in at least the predetermined number of failure scopes; and
   in response to the determination that the particular portion of the cluster has not obtained health votes in at least the predetermined number of failure scopes, preventing the particular portion of the cluster from providing the service while the particular portion has the health votes from the majority of the cluster members but does not have health votes from cluster members in at least the predetermined number of failure scopes.

2. The method of claim 1, further comprising detecting a loss of connectivity between a first failure scope and one or more other failure scopes, wherein the protecting against the split brain situation comprises starting a timer in response to detecting the loss of connectivity, wherein the enforcement of the voting constraint is done upon expiration of the timer.

3. The method of claim 1, wherein the service provides access to a database and preventing the particular portion of the cluster from providing the service comprises dismounting the database from each of the members in the particular portion of the cluster.

4. The method of claim 1, wherein each cluster member is a computing machine.

5. The method of claim 1, wherein the method further comprises receiving one or more instructions, the one or more instructions instructing a second particular portion in the cluster to participate in providing the service without obtaining a majority of health votes from cluster members.

6. The method of claim 5, wherein the one or more instructions comprise one or more user input instructions.

7. The method of claim 1, wherein the enforcing of the voting constraint is performed in response to detecting a loss of connectivity between a first failure scope in the cluster and one or more other failure scopes in the cluster, and wherein the loss of connectivity results from a faulty connection between the first failure scope and the one or more other failure scopes in the cluster.

8. The method of claim 1, wherein the enforcing of the voting constraint is performed in response to detecting a loss of connectivity between a first failure scope in the cluster and one or more other failure scopes in the cluster, and wherein the loss of connectivity results from poor health of the one or more other failure scopes in the cluster.

9. A computer system comprising:
at least one processor; and
memory comprising instructions stored thereon that when executed by at least one processor cause at least one processor to perform acts comprising:
managing a computer system cluster that is configured to provide a service, the cluster having a plurality of cluster members and the cluster being divided into a plurality of failure scopes, with each failure scope comprising a group of one or more cluster members and at least one of the failure scopes comprising a plurality of the cluster members, and the management including protecting against a split brain situation by enforcing a voting constraint, the voting constraint dictating that a portion of the cluster is allowed to provide the service while that portion has health votes from a majority of the cluster members and has health votes from cluster members in a predetermined number of failure scopes, the predetermined number being at least two, and the enforcement of the voting constraint including the following:
determining that a particular portion of the cluster has health votes from a majority of the cluster members, the health votes that the particular portion has received from the majority of the cluster members indicating that a majority of the cluster members is healthy and able to participate in providing the service with the particular portion of the cluster;
determining that the particular portion of the cluster has not obtained health votes from cluster members in at least the predetermined number of failure scopes; and
in response to the determination that the particular portion of the cluster has not obtained health votes in at least the predetermined number of failure scopes, preventing the particular portion of the cluster from providing the service while the particular portion has the health votes from the majority of the cluster members but does not have health votes from cluster members in at least the predetermined number of failure scopes.

10. The computer system of claim 9, wherein the predetermined number is two, wherein the enforcement of the voting constraint is done in response to identifying a disjoint communication situation in the computer cluster, and wherein the disjoint communication situation comprises a first failure scope, which has a majority of cluster members in the cluster, not having connectivity with one or more other failure scopes, such that the first failure scope does not have connectivity to a member in any other failure scope in the cluster.

11. The computer system of claim 9, wherein the enforcement of the voting constraint is in response to identifying a disjoint communication situation in the computer cluster, and wherein the disjoint communication situation comprises the particular portion not having connectivity with at least one member in at least the predetermined number of failure scopes in the cluster for a predetermined period of time.

12. The computer system of claim 9, wherein the service provides access to a database and preventing the particular portion of the cluster from providing the service comprises dismounting the database from each of the members in the particular portion of the cluster.

13. The computer system of claim 9, wherein each failure scope is in a different physical location.

14. The computer system of claim 9, wherein each cluster member is a computing machine.

15. The computer system of claim 9, wherein the acts further comprise receiving one or more instructions at a minority quorum of the cluster, the minority quorum having a minority of the cluster members, and the one or more instructions instructing the minority quorum to provide the service without obtaining a majority of health votes from cluster members.

16. The computer system of claim 15, wherein the one or more instructions comprise one or more user input instructions.

17. One or more computer-readable storage media having computer-executable instructions embodied thereon that, when executed by at least one processor, cause at least one processor to perform acts comprising:
managing a computer system cluster that is configured to provide access to a database, the cluster having a plurality of cluster members and the cluster being divided into a plurality of failure scopes, with each of the failure scopes comprising a group of one or more cluster members and at least one of the failure scopes comprising a plurality of the cluster members, and the management including enforcing a voting constraint, the voting constraint dictating that a portion of the cluster is allowed to provide access to the database while that portion has health votes from a majority of the cluster members and has health votes from cluster members in a predetermined number of failure scopes, the predetermined number being at least two, and the enforcement of the voting constraint including the following:
determining that a particular portion of the cluster has health votes from a majority of the cluster members, the health votes that the particular portion has received from the majority of the cluster members indicating that the majority of the cluster members is healthy and able to participate in providing access to the database with the particular portion of the cluster;
determining that the particular portion of the cluster has not obtained health votes from cluster members in at least the predetermined number of failure scopes; and
in response to the determination that the particular portion of the cluster has not obtained health votes in at least the predetermined number of failure scopes, preventing the particular portion of the cluster from providing access to the database while the particular portion has the health votes from the majority of the cluster members but does not have health votes from cluster members in at least the predetermined number of failure scopes.

18. The one or more computer-readable storage media of claim 17, wherein the acts further comprise receiving one or more instructions at a failure scope in the cluster, the one or more instructions instructing the failure scope to participate in providing access to the database without obtaining a majority of health votes from the members of the cluster.

19. The one or more computer-readable storage media of claim 18, wherein the one or more instructions comprise one or more user input instructions.

20. The method of claim 1, wherein the predetermined number of failure scopes is equal to a total number of failure scopes in the cluster.

* * * * *